(12) United States Patent
Weinstock

(10) Patent No.: US 8,493,655 B2
(45) Date of Patent: Jul. 23, 2013

(54) OPTICAL MODULE FOR INCREASING MAGNIFICATION OF MICROSCOPE

(76) Inventor: Ronald J. Weinstock, Corona Del Mar, CA (US)

( * ) Notice: Subject to any disclaimer, the term of this patent is extended or adjusted under 35 U.S.C. 154(b) by 763 days.

(21) Appl. No.: 12/583,494

(22) Filed: Aug. 21, 2009

(65) Prior Publication Data

US 2011/0043903 A1    Feb. 24, 2011

(51) Int. Cl.
G02B 21/00    (2006.01)
(52) U.S. Cl.
USPC .......................................... 359/380; 359/376
(58) Field of Classification Search
USPC ............... 359/372–380, 368, 381, 384, 421, 359/431
See application file for complete search history.

(56) References Cited

U.S. PATENT DOCUMENTS

| | | | |
|---|---|---|---|
| 3,645,602 A * | 2/1972 | Clave et al. | 359/421 |
| 4,643,541 A * | 2/1987 | Matsubara | 359/384 |
| 5,009,487 A * | 4/1991 | Reiner | 359/376 |
| 5,146,363 A | 9/1992 | Nagano | |
| 5,296,962 A * | 3/1994 | Furuhashi | 359/388 |
| 5,701,198 A | 12/1997 | Schoppe | |
| 5,764,408 A | 6/1998 | Otaki | |
| 6,208,462 B1 * | 3/2001 | Yonetani | 359/434 |
| 6,982,825 B2 * | 1/2006 | Sander | 359/377 |
| 7,256,934 B2 * | 8/2007 | Bihr et al. | 359/431 |

* cited by examiner

Primary Examiner — Frank Font
(74) Attorney, Agent, or Firm — Melvin K. Silverman

(57) ABSTRACT

An optical module for increasing magnification of a microscope includes an objective and an eyepiece between which is an optical path for light to travel. The optical includes light diverging elements for dividing the optical path into two parallel light paths after leaving the objective; and several orthonormally-arranged reflective elements including at least a first and a last reflective element, each reflective element having a reflective surface diagonal relative to the orthonormal arrangement of the elements, and also arranged to successively reflect the parallel light paths, from element to element, from the objective when the module is inserted in the optical microscope, beneath the eyepiece. Also included are light converging elements for converging the parallel paths into a single path before producing an image at the eyepiece.

7 Claims, 4 Drawing Sheets

OPTICAL MODULE FOR INCREASING MAGNIFICATION OF MICROSCOPE

BACKGROUND OF THE INVENTION

1. Field of the Invention

The present invention relates to the field of optical microscopy, and more specifically to an apparatus for enhancing magnification.

2. Prior Art

The prior art in the area of optical microscopes that entails the use of prisms as reflectors to achieve an enhanced capability are, on the one hand, limited to systems seeking to create a dual objective as, for example, to view a specimen at either two different magnifications or from two different directions at the same time, and other hand, microscopes seeking to achieve a stereoscopic effect at the eyepiece thereof, that is, a three-dimensional viewing of a specimen. The prior art which reflects one or more of these goals is represented by U.S. Pat. No. 5,146,363 (1992) to Nagano; U.S. Pat. No. 5,701,198 (1997) to Schoppe; U.S. Pat. No. 5,764,408 (1998) to Otaki; and U.S. Pat. No. 6,134,01 (2000) to Zavislan.

The present invention is also an improvement of the microscope module set forth in my application, now abandoned, of US. 2002/0181094 A1.

Of the above, only the reference to Otaki exhibits any awareness of the capability of the use of reflecting and deflecting prisms to effect a change of the external size or geometry of the microscope itself. Also, none of these references, or others known to the inventor, suggests the use of selectable combinations and positioning of wedge or triangular prisms to effectively increase the length of the optical path between the eyepiece and the objective to thereby increase the magnification of the optical microscope. Further, Otaki employs a three-dimensional path, which is not employed herewith.

Other prior art is U.S. Pat. No. 3,645,602 (1972) to Clave. It does not utilize an optical path of orthonormal rows and columns of mirrors or prisms, as taught herein, makes use of a Barlow amplifier, and does not employ a dual beam light path within the magnification module.

The present invention meets a long felt need in the art for a conventional microscope of enhanced modification but without significant increase in cost, size or complexity.

SUMMARY OF THE INVENTION

An optical module for increasing magnification of a microscope includes an objective and an eyepiece between which is an optical path for light to be magnified to travel. The optical module comprises light diverging means for dividing said optical path into two parallel light paths after leaving the objective; and a plurality of orthonormally-arranged reflective elements including at least a first and a last reflective element, each reflective element having a reflective surface diagonal relative to the orthonormal axes of arrangement of said elements, and also arranged to successively reflect said parallel light paths, from element to element, from said objective, when said module is inserted in said optical microscope beneath said eyepiece. Also included is a light converging means for converging said parallel paths into a single path before producing an image at said eyepiece.

It is accordingly an object of the invention to provide a module for the enhancement of the magnification of an optical microscope.

It is another object to provide a system, inclusive of such a module which, by folding of the optical path, increases the effective length thereof and, with it, the magnification of the microscope.

It is a still further object of the invention to provide a method of increasing magnification of an optical microscope by providing a plurality of orthonormal reflective elements, in the nature of prisms, between the objective and the eyepiece of the microscope, to effectively fold and, thereby, increase the optical path between the objective and the eyepiece of the system.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
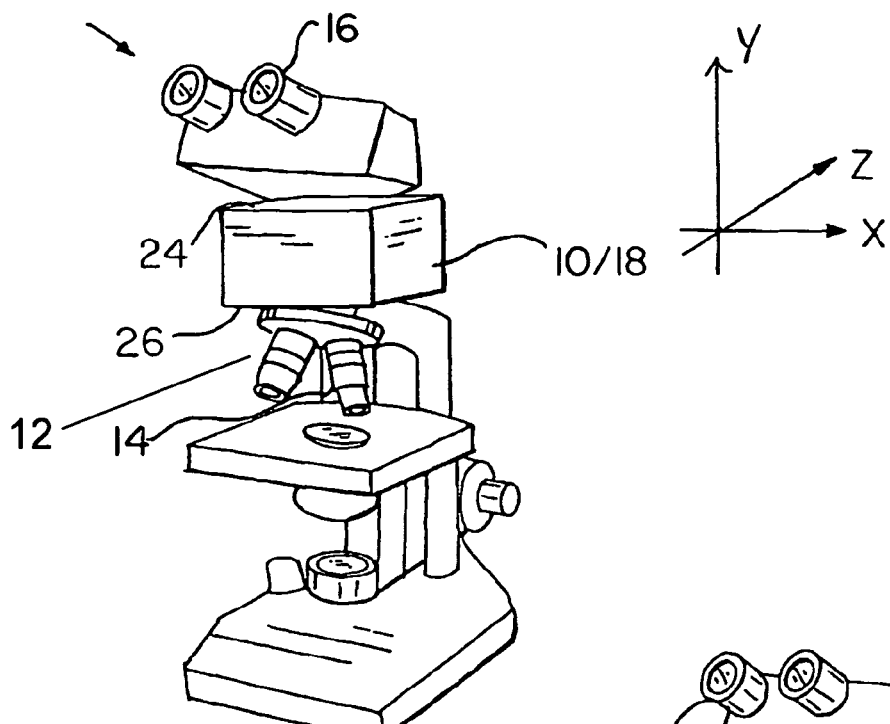
FIG. 1 is a schematic view that shows a magnification module inserted into an optical microscope.

As shown in FIG. 1, an optical module 10 can be inserted into a microscope 12, or similar optical magnification system, to enhance its magnification. The microscope 12 shown in FIG. 1 comprises a standard light microscope having, e.g., between about 1000× and 4000× magnification. As is conventional, said microscope 12 comprises an objective 14, an eyepiece 16, and an optical path 18 extending therebetween. This optical path has a standard length of between about 160 to 190 millimeters (mm), conventionally referred to as the tube length. The optical module 10 is inserted between the objective 14 and eyepiece 16. An X, Y, Z coordinate which is also shown in FIG. 1.

Figure 2:
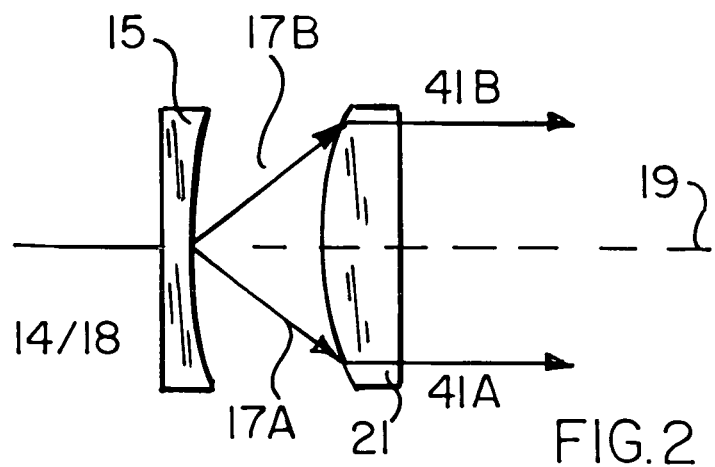
FIG. 2 is a schematic view of the lensing arrangement and optical path and geometry of the module input.

Shown in FIG. 2 is the optical path 18 from objective 14 and the beam separation or divergence strategy provided to provide input beams 41A and 41B to the optical module 10, below described. More particularly, light from objective 14 is provided along optical path 18 and axis 19 to a plano-concave lens 15 or equivalent diverging or beam splitting optical element. The curvature at the right side of lens 15 diverges the optical path into parts 17A and 17B which thereafter enter plano-convex lens 21 which convergently refracts each of the paths 17A and 17B by an angulation equal to the divergent refraction of lens 15, resulting in parallel output beams 41A and 41B.

Figure 3:
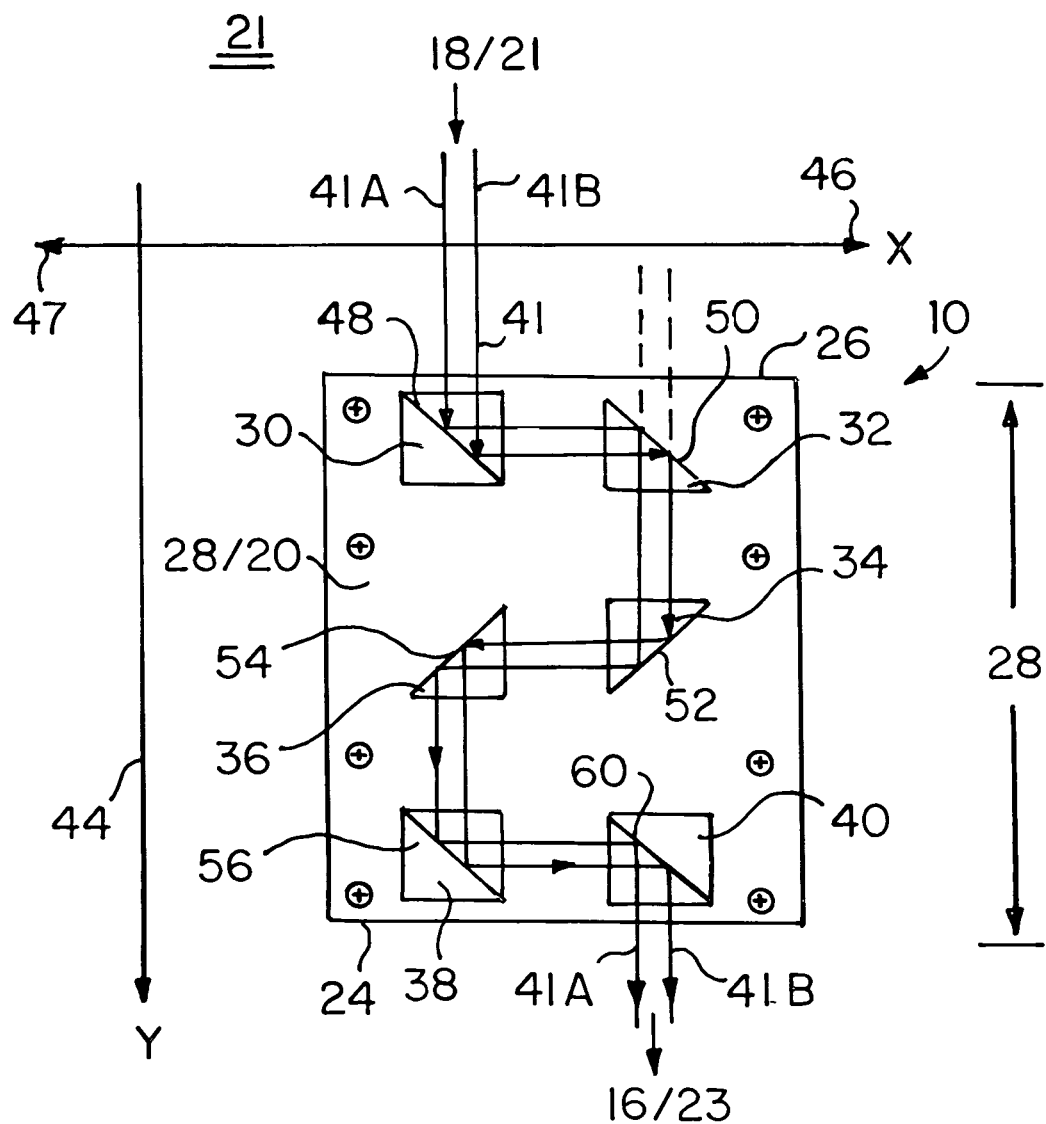
FIG. 3 is a schematic view of a first and embodiment of the magnification module, each including a plurality of reflectors.

As may be noted in FIG. 3, these optical outputs of lens 21 are directed into module 10 shown in FIG. 3 which shows one embodiment of said optical module 10 comprising a plurality of reflective elements supported upon a frame 20 for use within an optical magnification system. The frame 20 comprises a front plate 28 and a rear plate (not shown) with the plurality of reflective elements sandwiched therebetween. Said frame 20 and, therefore, the module 10 as well, are rectangular, having four sides, including an oppositely situated eyepiece side 24 and objective side 26. The module 10 is inserted into the optical microscope 12 such that the side 26 is adjacent the objective 14 and the side 24 is near the eyepiece 16 of the microscope. The module 10 has a length 28 spanning from side 24 to side 26. This length 28 is small sufficient that the module 10 can fit between the objective 14 and the eyepiece 16 of the microscope 12.

Figure 4:
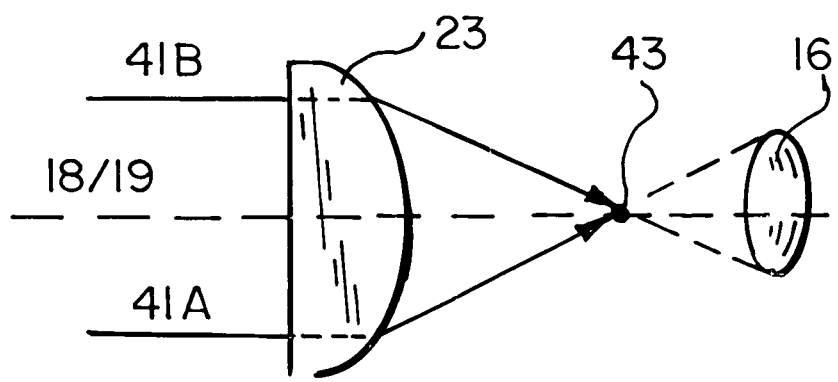
FIG. 4 is a schematic view of the optical path and lensing arrangement geometry of the output of the module to the eyepiece.

To enhance the magnification, said module 10 is inserted into said microscope 12 and aligned such that light from object 14 passes, in two parallel paths, through said lens 15 and 21 to module 10 and eventually to eyepiece 16 following lens 23. The reflective elements in the module 10 are arranged to direct light through the optical path 18. See FIG. 3. For example, the light from the objective 14 preferably reflects off of a first reflective element 30 mounted on the frame 20 of the module 10. This first reflective element reflects both beams 41A and 41B to a second reflective element 32 which will deflect the beam to a third reflective element 34, to a fourth element 36, to a fifth element 38, until the beam reaches a final reflective element 40 mounted near the upper side 24 of the module 10. The last reflective element 410 preferably directs the beam to the plano-convex lens of FIG. 4 which results in convergence of the beams at point 43 from which the resultant image may be viewed at eyepiece 16.

Rays of light from an object below the objective 14 will therefore transverse a path 18 (see FIG. 2) between the objective 14 and the eyepiece 16 that is longer than would exist if the optical module 10 were removed. In effect, module 10 increases, by a factor of at least two, the optical path length between the objective 14 and the eyepiece 16 beyond that of a standard tube length. As such, the optical path 18 between the objective 14 and the eyepiece 16 may be said to be folded such that the space separating the objective from the eyepiece can accommodate a longer optical path length or path 18 or optical axis 19. The longer optical path is thereby folded to fit into the small region between the objective 14 and the eyepiece 16.

Figure 5:
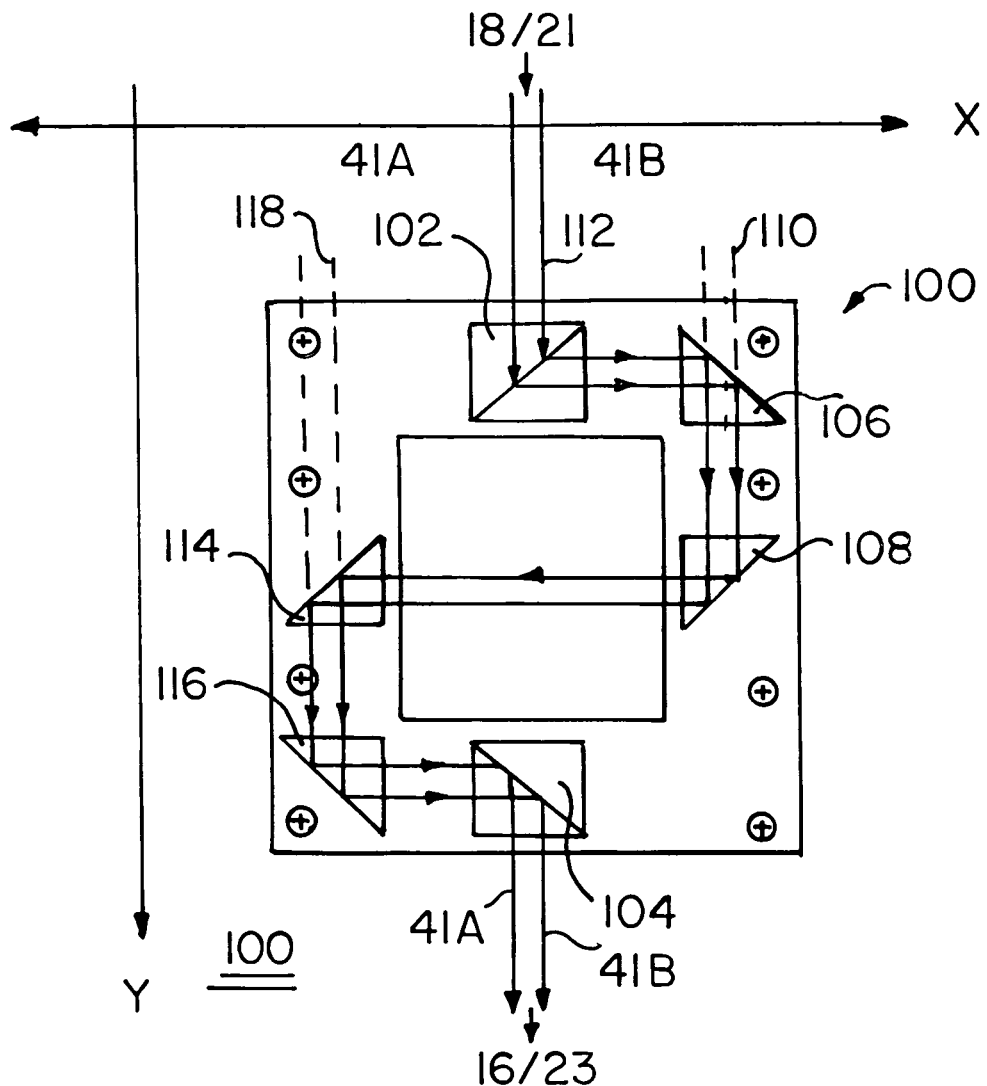
FIG. 5 is a schematic view of a second embodiment of the invention.

Various arrangements of the reflective elements can be employed to fold the optical path between the objective 14 and the eyepiece 16, as is shown in FIGS. 3 and 5. For example, in the embodiment depicted in FIG. 3 above described, six reflective elements, said first element 30, said second element 32, said third element 34, said fourth element 36, said fifth element 38, and said element sixth 40, are positioned on the frame 20 in two columns, each column comprising three reflective elements. These columns define a Y direction, shown in FIG. 3. The three elements may be equally spaced in columns along the Y direction 44, but need not be equidistantly spaced. In addition, each element 30, 36, 38 in the first column is aligned with a corresponding element 32, 34, 40 in the second column. The plurality of reflective elements 30-40 therefore comprises three rows, each row comprising two optical elements arranged along an X direction 46 which is orthonormal to said Y direction 44. The optical elements in each row are preferably, but not necessarily, spaced apart by a same distance as that separating adjacent elements in each Y column.

The first reflective element 30, mounted on the frame 20 of the module 10, comprises a cube having a reflective surface 48 therein oriented at about 45° to the X axis and Y axis, such that incident light will be reflected toward the second reflective element 32 in the X direction, which is the same row as the first reflective element 30.

The second element 32 comprises a triangular prism having a triangular cross-section and a reflective surface 50 also oriented at about 45° to the X direction 46 and Y direction 44 such that light will be reflected in the Y direction toward the third reflective element 34 which is situated in the next row.

The third reflective element 34 is similar to the second element 32, however the reflective surface 52 is oriented to direct light in a negative X direction 47 toward the fourth reflective element 36 which is in the same row as the third optical element 34. Accordingly, it has a reflective surface 54 at an approximately 45° angle with respect to the X direction and Y direction, but that is orthonormal to the reflective surface 50 in the second reflective element 32.

The fourth reflective element 36 is similar to the third element 32, however the reflective surface 54 is oriented to direct light in the Y direction 44 toward the fifth reflective element 38 which is the next row. Thus, the reflective surface 54 in the fourth reflective element 28 is parallel to the reflective surface 52 in the third reflective element 34.

The fifth reflective element 38 is similar to the fourth element 34, however the reflective surface 56 is perpendicular to that of the fourth element 54 to direct light in the X direction toward the sixth reflective element 40, which is in that same row as the fifth reflective element 38.

The sixth reflective element 40 also comprises a cube having a reflective surface 60 therein oriented at about 45° to the X direction and Y. Light directed from the fifth reflective element 38 will be deflected from the sixth reflective element 40 in the Y direction 44 and will exit the optical module 10 and propagate toward lens 23 converge at point 43 and to produce an image at the eyepiece 16. (See FIG. 4). As discussed above, the resulting configuration of elements creates a folded optical path wherein and inputs 41A/41B of light at the first element 30 will traverse a greater distance through each of the six optical elements 30 to 40 than they would otherwise, directly from the objective 14 to the eyepiece 16, had the optical module 10 not been inserted therein.

Note also that although six reflective elements 30 to 40 are employed in the embodiment of FIG. 3, the design of the optical module 10 is not so limited. Fewer or greater numbers of optical elements may be employed to increase the optical path length. At least part of this system of reflectors, such as for example the combination of elements 32, 34, 36, and 38, may be repeated one or multiple times to generate increasingly long optical path lengths in one apparatus. In other embodiments, the optical path may span several layers of the optical module, for example in the vertical direction, to further increase path length without increasing overall length and width of the module.

As shown in FIG. 5, the first 102 and sixth 104 optical elements are similar in this embodiment. In preferred embodiments of the invention, one or more elements may comprise a prism, having a reflective interface therein. The elements may comprise a transparent media with a reflective surface formed therein; in such cases, the media provides efficient transmission of light with low attenuation, and preferably minimal chromatic aberration.

The second 106, third 108, fourth 114, and fifth 116 optical elements are all similar as well, each generally comprising a prism having a triangular shape. These elements may be configured such that the dual light paths are incident on a flat surface of the prism, and subsequently propagate through the prism toward another reflective surface that is angled, e.g., at approximately 45° with respect to the direction of propagation, where the beams of light are reflected and propagated through the prism before emission from another surface in direction which are at approximately 90° to the initial direction of the incoming beams.

In other embodiments, the reflective surfaces of the elements may be coated with a particularly reflective material, such as aluminum to enhance the reflective capabilities of the element. The elements are preferably made from an optically clear material which provides efficient transmission for light and low chromatic aberration.

In the embodiment of FIG. 5, a module 100 comprises six optical elements defining three columns. The first 102 and the sixth 104 elements are positioned in the column oriented in the Y direction. The second 106 and third 108 elements are positioned in a second column 110 parallel to the first column 112 of the module 100 and the fourth 114 and fifth 116 optional elements are positioned in a third column 118 also parallel to the first 112 and second columns 110 The first column 112 is located centrally on the apparatus 10, flanked by the second column 110 and third column 118 which are parallel to the first column 112. The first element 102 and sixth optical element 104 are of the quartz prism type described above, but may be or another preferable reflective type; such as a mirror. The second 106, third 108, fourth 114, and fifth 116 elements may all be of the prism type, described above having reflective surfaces oriented at about 45° to their respective optical axis, or of the mirror type described above, or any combination of the many different types of reflectors which may be used to accomplish the same object. In FIG. 5, the overall apparatus maybe for example about 60 mm in length. The elements of module 100 may vary in spacing from about 20 to 35 mm, or in arrangement thereof, while not interfering with the effectiveness of the system. However, at spacing of about 33 mm has been found to be optimal for modules with many elements therein avoid convergence. The system 100 of optical elements, such as the combination of the second 106, third 108, fourth 114, and fifth 116 elements, is used to create a folded optical path which may be repeated one, or multiple times, to generate increasingly long optical path lengths in one apparatus.

In FIG. 5, the dual light paths 41A and 41B are incident on the first optical element 102 in the Y direction where it is reflected orthonormally toward the second optical element 106 in the X direction. The second optical element 106 will reflect incident light along the second column in the Y direction, towards the third optical element 108. The third element 108 will reflect incident light from the second element 106 orthonormally toward the fourth element 114, in the negative X direction. The fourth element 114 will reflect incident light along the third column 118 in the Y direction toward the fifth optical element 116. The fifth optical element 116 will reflect light from the fourth element 114 in the X direction toward the sixth element 104. The sixth element will reflect light from the fifth element 116, in the Y direction for emission 16/23 from the module 100 to the eyepiece.

In other embodiments, any number of elements may comprise other types of reflective elements such as mirrors, more preferably of the first-surface reflective type. For example, a first-surface reflector, oriented at approximately 45° to the direction of the light path, would reflect light in a desired direction within the module eliminating the phase transition of the light associated with prism type optical elements. In combination with one or more reflective or refractive elements, these reflectors may create a desired folded optical path for the module.

In the preferred embodiment, which is FIG. 3, the elements 30 to 40 are approximately one inch in height, width and length. As such, they define an aperture one inch square which limits or stops down the beam of light transversing from the objective 14 to the eyepiece 16. The optical elements 30 to 40 are located equally spaced apart in each column 41, 42 and, in each row, by 33 mm or less, but may be spaced otherwise than equi-distantly. It has bee found that a separation of about 33 mm between elements optimizes resolution of the image. The module 10 is therefore approximately 130 cm long by 105 cm wide. The elements 30 to 42 are mounted on a said frame 20 which is capable of supporting the elements, and are fastened to the frame 20 in a way which will retain the position of the elements, and preferably prevent any vibrations, or other mechanical disturbances of the elements.

As described above, the optical module 10 or 100 are intended for use within an optical microscope 12. The invention is inserted between an objective 14 and an eyepiece 16. In a typical microscope 12, light gathered from the sample by the objective 14, would be propagated to the eyepiece 16 directly, in the embodiments described above, such light gathered by the objective, according to the strategy shown in FIG. 2, would be incident onto the first elements 30/102 of the module. The eyepiece 16 is then positioned to gather light emitted from the final elements 40/104 in the modules. In a preferred embodiment, the eyepiece 16 is in close proximity to the final elements 40/104, while the objective 14 is located adjacent the first elements 30/102. In other embodiments, for example, the light is projected from the objective 14 no more than 30 mm before it is incident on the first optical element 30/102 in the module 10 or 100. The light beam is then bent at right angles, as set forth above.

The configurations described above greatly enhance magnification beyond what is provided by the objective 14 and eyepiece 16 as arranged in the optical microscope 12 without the module inserted therein. The optical microscope 12 can be used with microscopes that employ other specialized microscopy techniques such as fluorescent and polarization microscopy.

Figure 6:
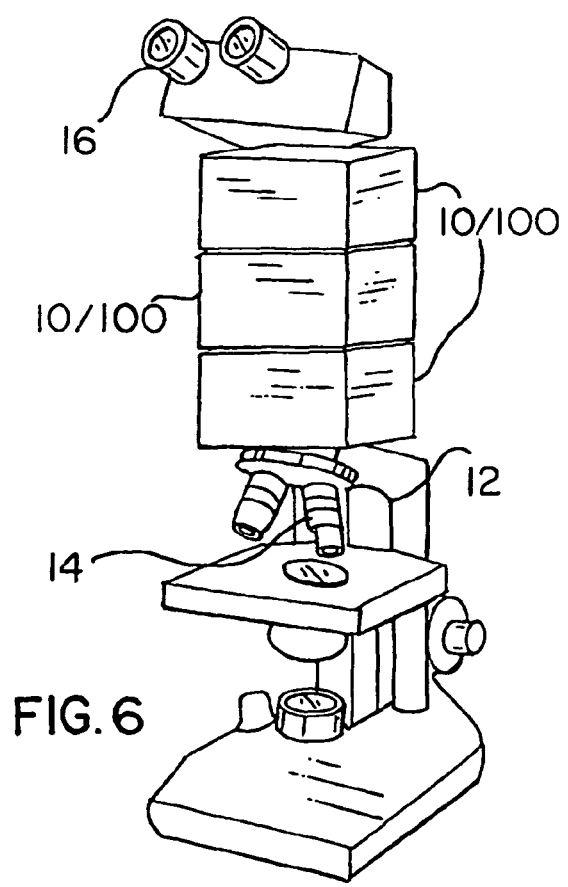
FIG. 6 depicts a plurality of magnification modules cascaded together and inserted into the optical microscope.

Additionally, many of these modules 10 or 100 may be used in series to increase the magnification further. This series may comprise many modules, or a single module with, for example, a very long optical path. FIG. 6 depicts a plurality of optical modules 10/100, such as those described with reference to FIGS. 3 and 5, that are cascaded to provide a longer folded optical path between the objective 14 and the eyepiece 16.

Although described above in connection with particular embodiments of the present invention, it should be understood that the description to the embodiments are illustrative of the invention and are not intended to be limiting. Accordingly, various modifications and applications may occur to those skilled in the art without departing from the true spirit and scope of the invention.

The invention claimed is:
1. An optical module for increasing magnification of a microscope having an objective and an eyepiece between which is an optical path for light to travel from said objective to said eyepiece, said optical module comprising:
(a) light diverging means for dividing said optical path into two parallel light paths after leaving the objective;
(b) a plurality of reflective orthonormally-arranged intermediate elements including at least a first and a last reflective element, each reflective element having a reflective surface diagonal relative to orthonormal axes of each of said elements, said axes transverse to said path of said light diverging means, and arranged successively and orthonormally to reflect said light paths, in which each surface diagonal, other than an eye-piece related diagonal, reflect light inwardly toward a next surface diagonal in said parallel light paths from element to element, from said objective when said module is inserted in said optical microscope, beneath said eyepiece, in which none of said reflective elements include a reflective surface parallel to said optical path between the eyepiece and the objective; and (c) means for converging said parallel light paths into a single path before producing an image at said eyepiece.

2. The optical module of claim 1, in which said plurality of reflective elements comprise at least four reflective elements.

3. The optical module of claim 1, in which said reflective elements comprise prisms having at least one reflective surface.

4. The optical module of claim 1, in which said reflective elements comprise mirrors.

5. The module as recited in claim 1, in which said light diverging means comprises a plano-concave lens followed by a plano-convex lens, both lens arranged upon a common optical axis originating at said objective.

6. The module as recited in claim 1, in which said light converging means comprises a plano-convex lens, the convex surface thereof facing said eyepiece.

7. The module as recited in claim 1, in which separations between successive orthonormally-arranged elements defines 33 mm or less.

* * * * *